United States Patent [19]

Brown

[11] Patent Number: 4,763,470

[45] Date of Patent: Aug. 16, 1988

[54] SPRING COLLAR COUPLING

[75] Inventor: Jeffrey K. Brown, Moorpark, Calif.

[73] Assignee: Rockwell International Corporation, El Segundo, Calif.

[21] Appl. No.: 8,988

[22] Filed: Jan. 30, 1987

[51] Int. Cl.[4] ............................ F02K 9/42; F02K 9/60
[52] U.S. Cl. ..................................... 60/257; 403/336; 285/361; 285/377
[58] Field of Search ............... 285/360, 361, 376, 377, 285/396, 401, 402, 286; 403/336, 338; 60/257

[56] References Cited

U.S. PATENT DOCUMENTS

| 365,388 | 6/1887 | Klein | 285/360 |
|---|---|---|---|
| 1,200,118 | 10/1916 | Keeler | 285/361 |
| 2,165,163 | 7/1939 | Waters | 285/361 |
| 2,532,773 | 12/1950 | Kellam | 285/361 |
| 2,935,342 | 5/1960 | Seamark | 285/376 |
| 3,702,708 | 11/1972 | Moore | 285/361 |
| 4,231,708 | 11/1980 | Telesio | 248/647 |
| 4,543,074 | 9/1985 | Ville et al. | 464/33 |
| 4,575,274 | 3/1986 | Hayward | 403/2 |
| 4,587,786 | 5/1986 | Woods | 52/638 |

FOREIGN PATENT DOCUMENTS

| 396596 | 6/1924 | Fed. Rep. of Germany | 285/360 |
|---|---|---|---|
| 616980 | 2/1927 | France | 285/360 |

Primary Examiner—Donald E. Stout
Attorney, Agent, or Firm—H. Fredrick Hamann; Harry B. Field; David C. Faulkner

[57] ABSTRACT

A spring collar coupling (10) is provided for joining opposing fluid conduits. Basically, the spring collar coupling comprises a spring collar (20) in cooperative engagement with a first and second flange member (40, 60) functionally joined by the application of a coaxial force, the insertion of a bayonet locking ring (70) and release of the pressure force to effect a coupling of the aforesaid components.

4 Claims, 3 Drawing Sheets

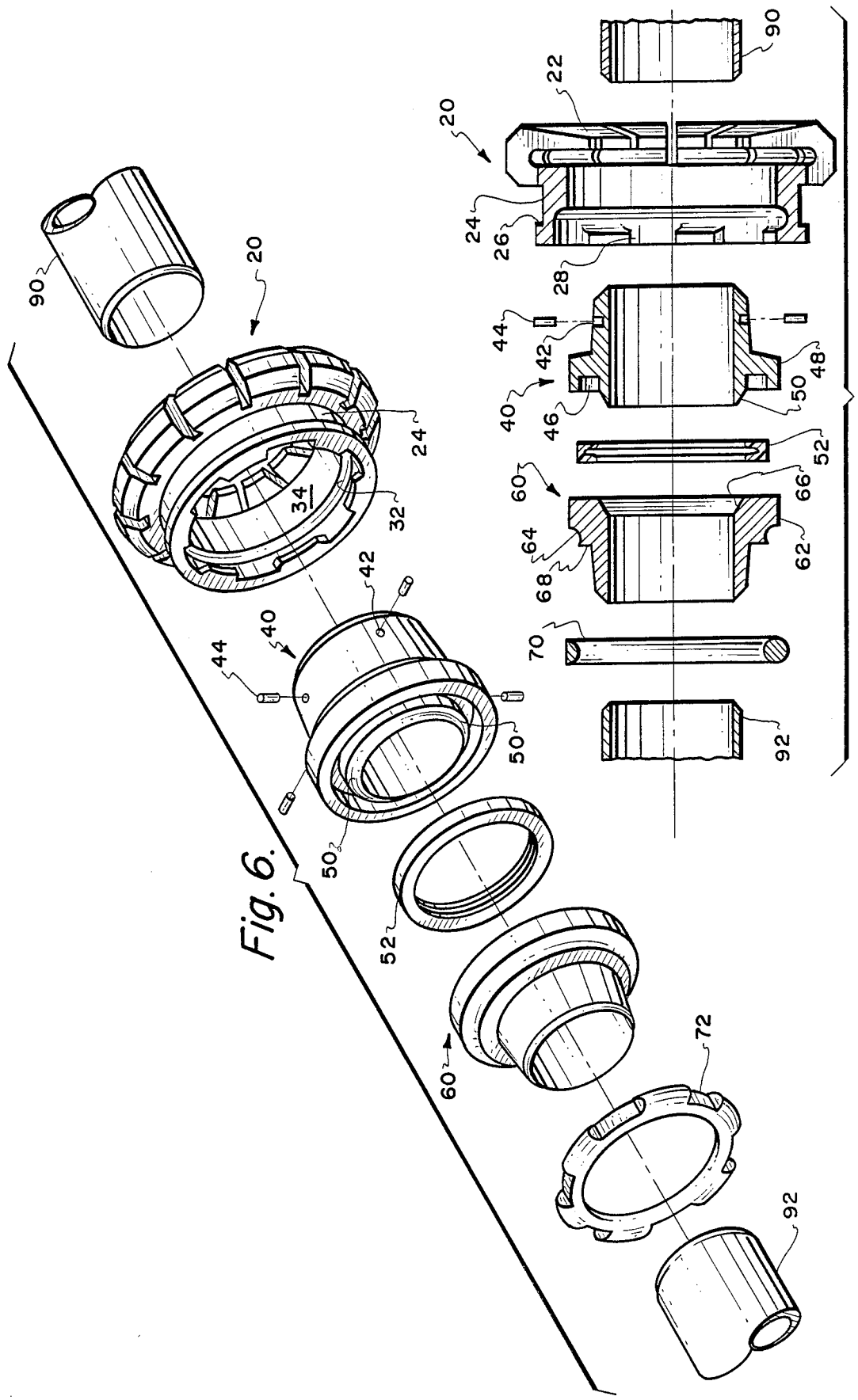

SPRING COLLAR COUPLING

STATEMENT OF GOVERNMENT INTEREST

The invention described herein was made in the performance of work under Contract No. NAS3-23773 and is subject to the provisions of Section 305 of the National Aeronautics and Space Act of 1958 (72 Stat. 435; 42 USC 2457).

BACKGROUND OF THE INVENTION

1. Field of the Invention

The present invention relates generally to a connector and, more particularly, to a spring collar coupling connector. While the present invention will be described specifically with respect to a fluid delivery system, it will be appreciated that the invention is adaptable for use with other types of connectors, such as electric connections or structural connections.

2. Background Art

The background art is replete with assemblies for use as cable connectors, clutch connectors or connectors used in scaffolding, to name but a few.

For example, Hayward (U.S. Pat. No. 4,575,274) describes a connector assembly having two major normally separable components 10 and 12. Body portion 10 generally fabricated of an electrical conducting material is designed with threaded segments for receiving nut portion 12.

Ville et al (U.S. Pat. No. 4,543,074) describe a frangible device for coupling two rotary machines. This device includes a first shaft 1 and a second shaft 2. The power transmission is effected by a dog-clutch connection 9 and 11 between shafts 1 and 2.

Woods (U.S. Pat No. 4,587,786) relates to a locking Disc for use in scaffolding. Disc D form a plurality of components which include a plurality of base-plates 10 each provided with vertically extending threaded shank 11 receiving a cooperating adjustment nut 12. A plurality of ledgers and/or transoms 15, opposite ends of which each have a slot 16, are also provided in each of these slots and is adapted to receive a portion of a locking Disc D.

BRIEF SUMMARY AND OBJECTS OF THE INVENTION

The spring collar coupling of the present invention is designed to ensure a safe and reliable means of mating conduits particularly in limited access locations or hostile environments.

According to a principal aspect of the present invention, there is provided a spring collar coupling which has a captive feature for engaging and retaining a connecting member. The spring collar coupling includes a spring collar in functional association with a right flange member and a left flange member. A bayonet locking ring serves to lock the first and second flange members together with cooperative relationship once same have been mated to the spring collar.

It is, therefore, an object of this invention to provided a spring collar coupling including a minimum number of cooperating elements.

Another object of the present invention is to provide a spring collar coupling requiring sequential, rather than multiple and complex actuation steps and which is simple and reliable in use.

These and other objects, advantages and novel features of the present invention will be apparent from the following detailed description of the invention, taken with reference to accompanying drawings.

BRIEF DESCRIPTION OF THE DRAWINGS

FIG. 6 is an exploded view of the spring collar showing component parts in relation to opposing fluid conduits.

FIG. 7 is a cross-sectional exploded view of the spring collar coupling.

DETAILED DESCRIPTION OF THE INVENTION

Figure 1:
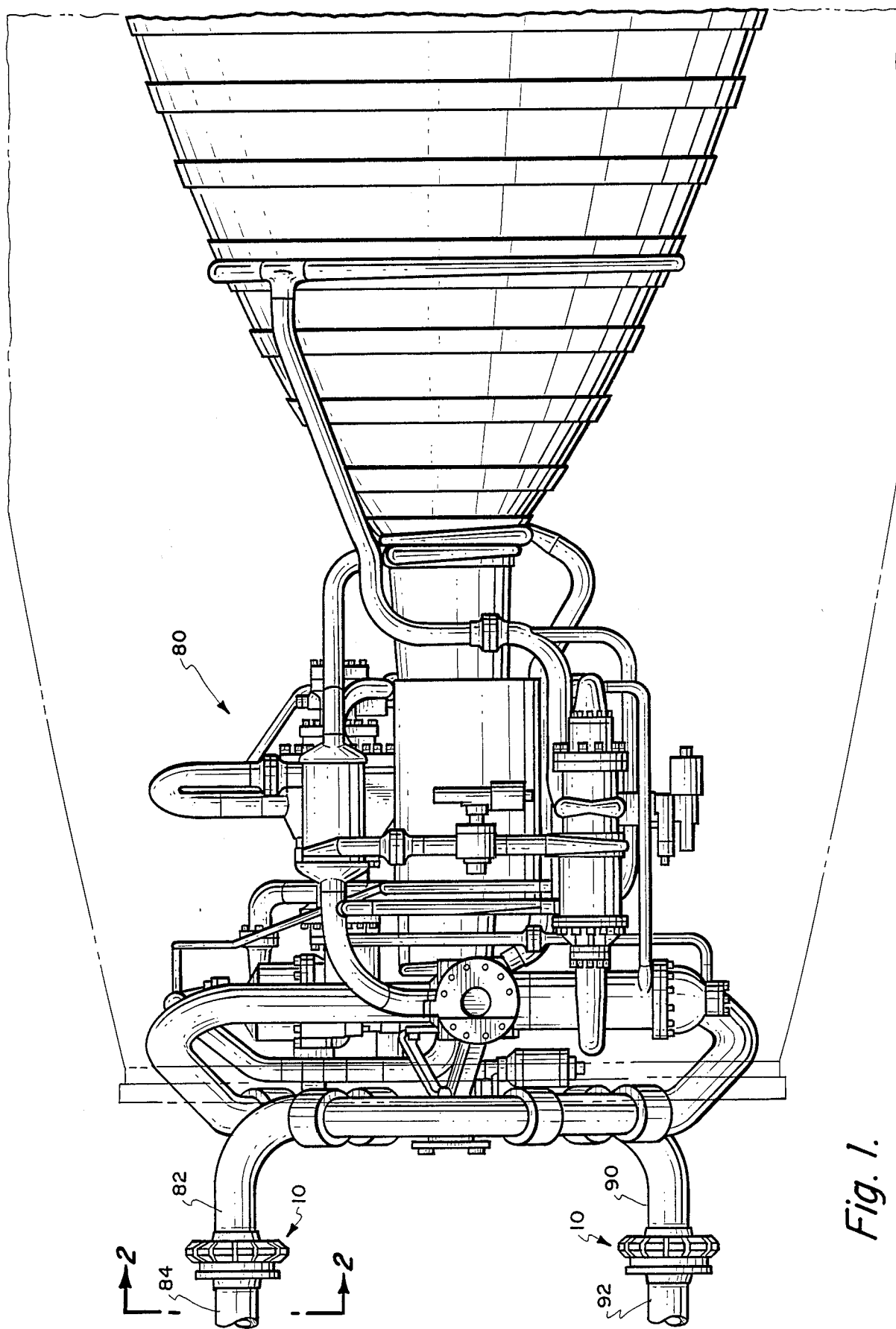
FIG. 1 is a perspective view of the present invention in cooperative engagement with fluid conduits serving a reaction or rocket engine.
Figure 2:
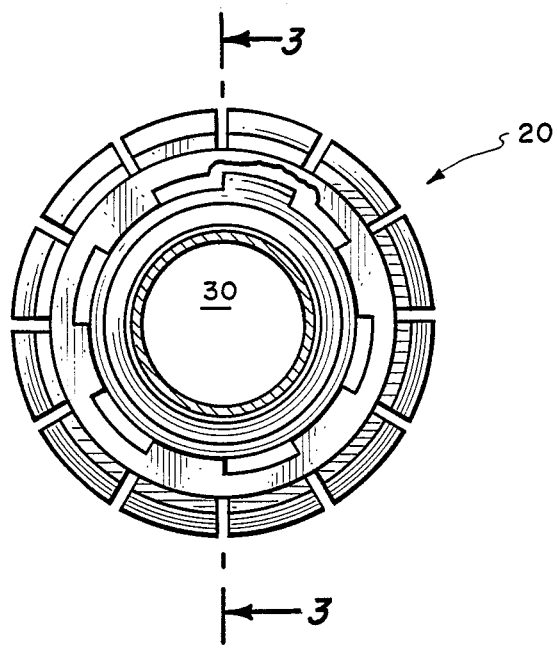
FIG. 2 is a cross-sectional view of the invention taken along line 2—2 of FIG. 1.
Figure 3:
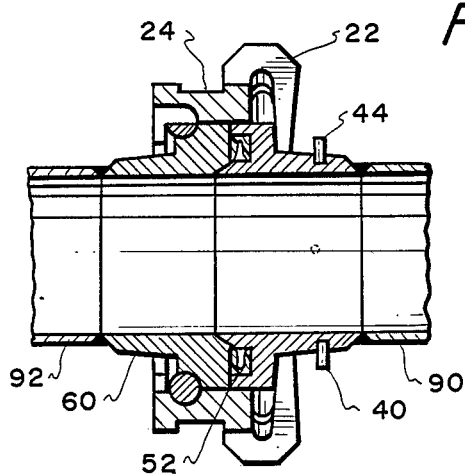
FIG. 3 is a vertical sectional view taken along line 3—3 of FIG. 2.
Figure 4:
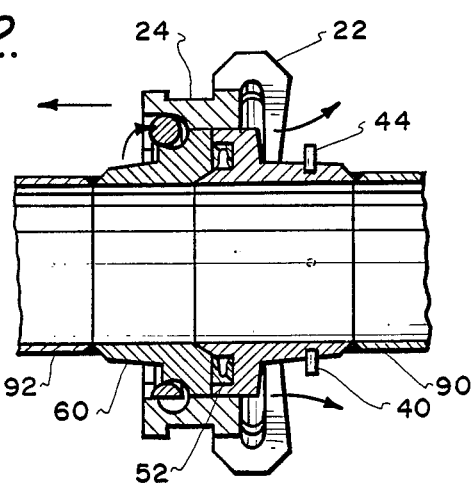
FIG. 4 depicts the engagement and locking sequence of the spring collar coupling.
Figure 5:
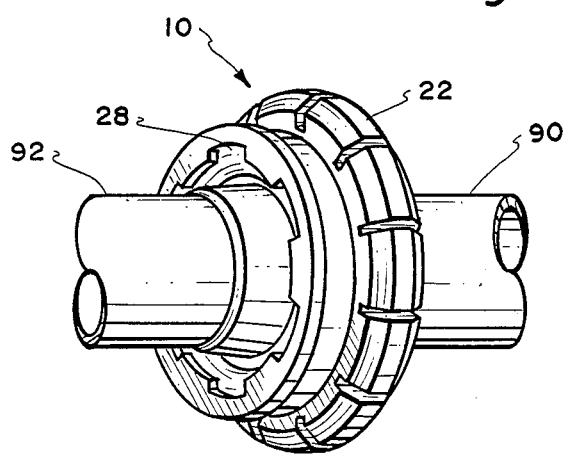
FIG. 5 is a perspective view of the spring collar of the present invention.

Reference is made to FIG. 1-5 of the drawings which illustrate a preferred embodiment of the present invention. Referring to the drawings, the spring collar coupling 10 includes a spring collar 20, first and second flanges members 40 and 60, respectively, and seal 52 positioned and retained therebetween with the assembly of the spring collar coupling components. Bayonet locking ring 70 engages spring collar 20 to effect a frictional locking of the coupling as more fully described below.

As shown in FIGS. 6 and 7, circular spring collar 20 is provided with a plurality of axially spaced arms 22, annular recess 24 formed within collar 20, and a plurality of slots 28 formed within the end of collar 20 opposing arms 22. A passageway 30 is defined by spring collar 20 (see FIG. 2).

First hollow tubular-shaped flange member 40 includes axially spaced retaining pin slots 42 in which are positioned retaining pins 44. Member 40 is also provided within seal gland or slot 46 formed with raised annular section or flange 48 and beveled surface 50. Circular seal 52 is positioned within slot 46 and forms a fluid-tight seal when beveled surface 50 contacts reciprocal beveled surface 66 formed internally of raised annular collar 62 of left flange member 60. An annular or toroidal recess 64 formed in raised annular collar 62 receives bayonet locking ring 70 having bayonet ring slots 72 (see FIG. 6) which function in cooperation with spring collar slots 28 of spring collar 20.

To illustrate the utility of the present invention, rocket or reaction engine 80, as seen in FIG. 1, incorporates spring collar coupling 10 to effect joinder of fuel inlet 82 and fuel conduit 84 as well as oxidizer inlet 90 with oxidizer conduit 92. The spring collar coupling is assembled and connected to the inlets and conduits in following manner.

Initially, hollow right flange member 40 is mated to spring collar 20 by inserting member 40 into passageway 30 until raised flange 48 abuts inner wall surface 32 (see FIG. 6). Member 40 is initially retained within passageway 30 by retaining pins 44 which effect a friction grip with interior wall surface 34 of spring collar 20. Next, flange members 40 and 60 are joined to oxidizer inlets 90 and 92, respectively, such as by welding to afford a permanent coupling therebetween.

Once the flange members 40 and 60, and inlets 90, 92 have been respectively mated, seal 52 which is preferably of a metallic material is inserted into seal gland or recess 46. Next, opposing coaxial forces are simultaneously applied such as with a removable clam-shell type wrench (not shown), to surface 68 of flange 60 and to annular spring collar surface 26 (see FIG. 7) as shown by the arrows in FIG. 4. Simultaneously, left flange member 60 is mated to right flange member 40 affording contact between surfaces 50 and 66. At this time, bayonet locking ring 70 is inserted into spring collar slots 28 and rotated clockwise (see FIG. 5) which locks the rings 70 in place and maintains the force supplied by the wrench to recess 24. The wrench may then be removed. The spring collar coupling is now securely locked in position joining inlet 90 with conduit 92. Of course, it is to be understood that coupling 10 joining fuel inlet 82 and fuel conduit 84 is provided in the same manner as for inlet 90 and conduit 92.

Should engine 80 need to be decoupled from conduits 84 and 92, a compression force would be applied, as before described, to surface 24 in collar 20 and surface 68 in flange 60. This would allow rotation of locking ring 70 counter-clockwise and removal thereof through spring collar slots 28 to effectively separate member 60 from member 40.

It will of course be realized that various modifications can be made in the design and operation of the present invention without departing from the spirit thereof. Thus, while principal, preferred construction, and mode of operation of the invention have been explained, it is to be understood that within the scope of the appended claims the invention may be practiced otherwise than as specifically illustrated and described.

What is claimed and desired to be secured by Letters Patent of the United States is:

1. A spring collar coupling comprising in combination;
   a circular spring collar including a plurality of axially-spaced spring collar arms and an annular spring collar recess formed within said collar;
   a plurality of spring collar slots formed within the end of said collar in opposing relationship to said collar arms and a passageway defined by the circular spring collar;
   a first hollow tubular-shaped flange member including a raised annular section at one end thereof, a seal gland formed within the raised annular section, retaining pin slots formed axially within a surface portion of the first flange member and retaining pins retainable within the slot;
   a second hollow tubular-shaped flange member including a raised annular collar and an annular recess formed in the annular collar; and
   means for locking and securing the flange members in a sealed, mating relationship with the spring collar.

2. A spring collar coupling according to claim 1 in which the means for locking and securing the flange members and spring collar comprise:
   a circular seal; and
   a circular bayonet locking ring including axial ring slots, both sealably engaged with the spring collar.

3. A rocket engine having a fuel inlet, oxidizer inlet, fuel conduit, oxidizer conduit and spring collar coupling, said coupling joining said fuel inlet to said fuel conduit and said oxidizer inlet to said oxidizer conduit, and which coupling comprises in combination:
   a circular spring collar including a plurality of axially-spaced spring collar arms and an annular collar recess formed within said collar;
   a plurality of spring collar slots formed within the end outset collar in opposing relationship to the collar arm and a passageway defined by the circular spring collar;
   a first hollow tubular-shaped flange member including a raised annular section at one end thereof, a seal gland formed within the raised annular section, retaining pin slots formed axially within a surface portion of the first flange member and retaining pins retainable within the slot;
   a second hollow tubular-shaped flange member including a raised annular collar and an annular recess formed in the annular collar; and
   means for locking and securing the flange members in a sealed, mating relationship with the spring collar.

4. A rocket engine having a spring collar coupling according to claim 3 in which the means for locking and securing the flange members and spring collar comprise:
   a circular seal; and
   a circular bayonet locking ring including axial ring slots, both sealably engaged with the spring collar.

* * * * *